March 17, 1964    R. P. McGRAW ETAL    3,125,269
DISPENSING MACHINE

Filed March 6, 1961    4 Sheets-Sheet 1

ROBERT P. MC GRAW
HARRY A. SNYDER
INVENTORS
HUEBNER & WORREL
ATTORNEYS
BY

March 17, 1964   R. P. McGRAW ETAL   3,125,269
DISPENSING MACHINE
Filed March 6, 1961   4 Sheets-Sheet 2

ROBERT P. MC GRAW
HARRY A. SNYDER
INVENTORS
HUEBNER & WORREL
ATTORNEYS
BY
Richard M. Worrel

ROBERT P. MC GRAW
HARRY A. SNYDER
INVENTORS
HUEBNER & WORREL
ATTORNEYS

United States Patent Office 3,125,269
Patented Mar. 17, 1964

3,125,269
DISPENSING MACHINE
Robert P. McGraw, 668 Blackstone, Fresno, Calif., and
Harry A. Snyder, 1920 N. Chester, Bakersfield, Calif.
Filed Mar. 6, 1961, Ser. No. 93,421
18 Claims. (Cl. 226—110)

The present invention relates to a dispensing machine and, more particularly, to such a machine including a rotary feeding element for effecting the dispensing action of the machine and to a drive mechanism for controlling rotation of the feeding element, said machine and element being excellently suited for dispensing predetermined lengths of sheet material motivated by said element.

The distribution of trading stamps with purchases of various products and services has spread rapidly in recent years. Most retailers utilizing trading stamps hope to increase their volume of total sales without increasing prices. If successful, the cost of the stamps can be spread over the greater volume thereby yielding increased net profit. Unfortunately, for most retailers, this ideal does not materialize. As more and more merchants adopt trading stamps, the competitive advantage to each is watered down. Accordingly, it is extremely important for such merchants to maintain a careful check on the costs of a trading stamp program.

There are other costs apart from the cost of the stamps per se. Despite the wide use of stamps over the past decade in particular, these stamps are almost exclusively distributed by hand. Typically, at a check-out stand, the clerk tears off a number of stamps corresponding to the amount of the purchase, usually one stamp for each ten cents in purchases. Individual stamps, or sheets or strips thereof, are often randomly placed in a box or drawer adjacent to the cash register. The time of sales personnel is uneconomically devoted to this piecemeal, and sometimes erroneous stamp distribution while customers are inconvenienced. Neither the customer nor the clerk has any quick and accurate method of determining if the number of stamps given is correct. Usually the customer relies on the clerk in view of the small amount involved. The errors are cumulative and may result in significant loss to the merchant or his customers over a period of time. Again, the owner has no control over pilferage by store personnel. In summary, surveys have revealed that there is a national average of over five hundred dollars lost per check-out stand per supermarket in the United States incident to improper stamp control and this figure is exclusive of loss of clerical time.

The subject invention is excellently suited for dispensing trading stamps. As will be evident, however, it is useful in dispensing other sheet material for other purposes.

Accordingly, it is an object of the present invention to provide an improved dispensing machine of the character described.

Another object is to provide an improved electromechanical drive mechanism for a dispensing machine.

Another object is to control the rotation of a rotary feeding element of a dispensing machine so that such element rotates in discrete but selected angular increments.

Another object is to facilitate the distribution of trading stamps.

Another object is to minimize the labor, expense, and inconvenience involved, and otherwise to obtain better control of, the distribution of trading stamps.

Another object is to provide a clutch controlled, gear driving mechanism for controlled feeding of flexible sheet material wherein the feeding action is interrupted upon disengagement of the clutch.

Another object is to provide an electrically controlled system for disengaging the clutch of the mechanism described in the preceding paragraph after a predetermined length of a sheet material has been dispensed.

Another object is to provide a drive mechanism for a dispensing machine which minimizes movable mechanical parts and emphasizes electrical control thereby to increase dependability of operation and to minimize maintenance requirements.

These, together with other objects, will become more fully apparent upon reference to the following description and accompanying drawings.

Figure 1:
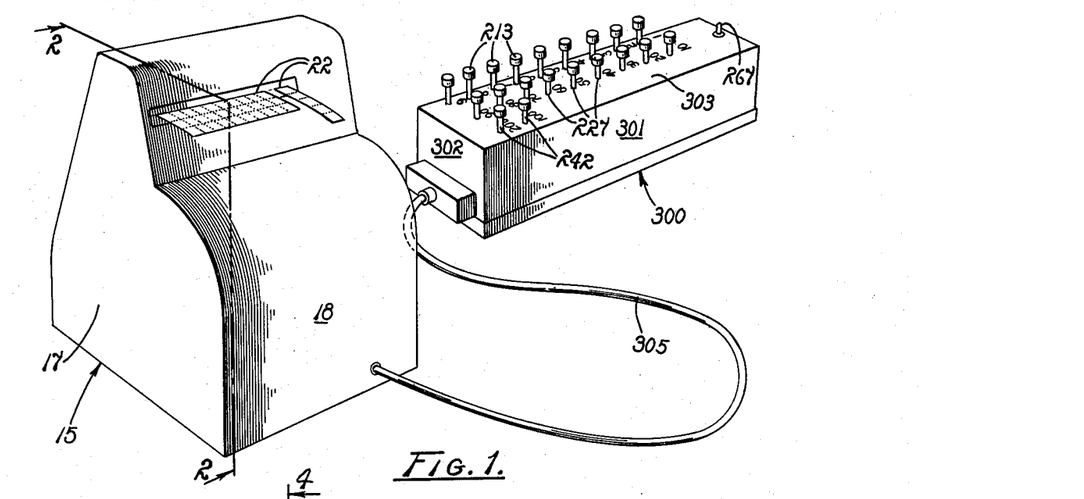
FIG. 1 is a perspective view of a dispensing machine including a dispensing housing and switch box electrically interconnected by a cable.
Figure 2:
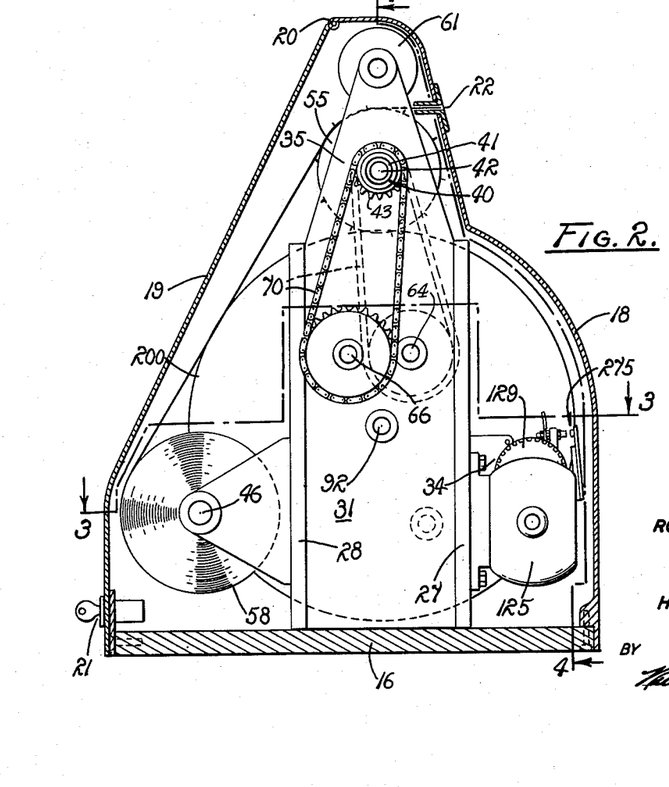
FIG. 2 is a somewhat enlarged, transverse section taken on line 2—2 in FIG. 1.

Referring more particularly to the drawings, the subject dispensing machine includes a dispensing housing 15 having a base 16, spaced parallel side walls 17 upstanding from the base, a front wall 18 interconnecting the side walls and secured to the base, and a rear wall 19 connected to the front wall by an upper hinge 20. The rear wall is movable between a closed position in opposed relation to the front wall, as shown in FIG. 2, for example, and an open position, not shown, but swung upwardly from its closed position in a manner believed evident. The rear wall is held in closed position by a lock 21. With particular reference to FIGS. 1 and 2, the upper portion of the front wall includes longitudinally aligned, long and short dispensing slots 22.

Figure 3:
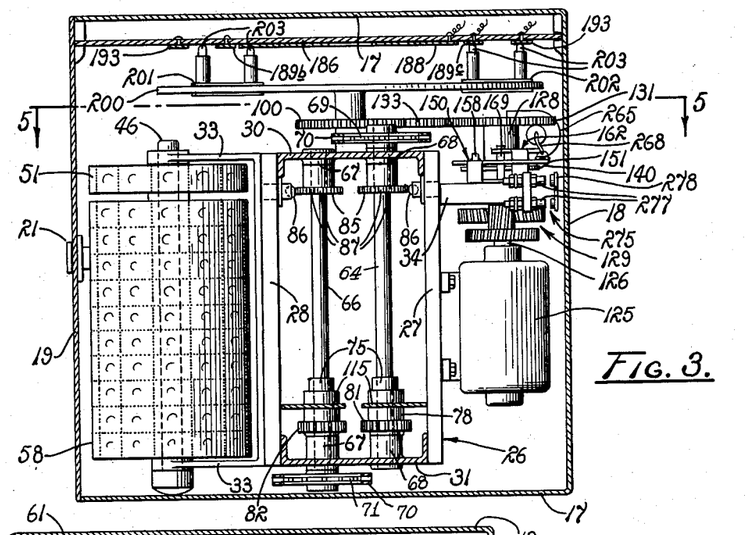
FIG. 3 is a horizontal section through the dispensing housing taken at a position represented by line 3—3 in FIG. 2.
Figure 4:
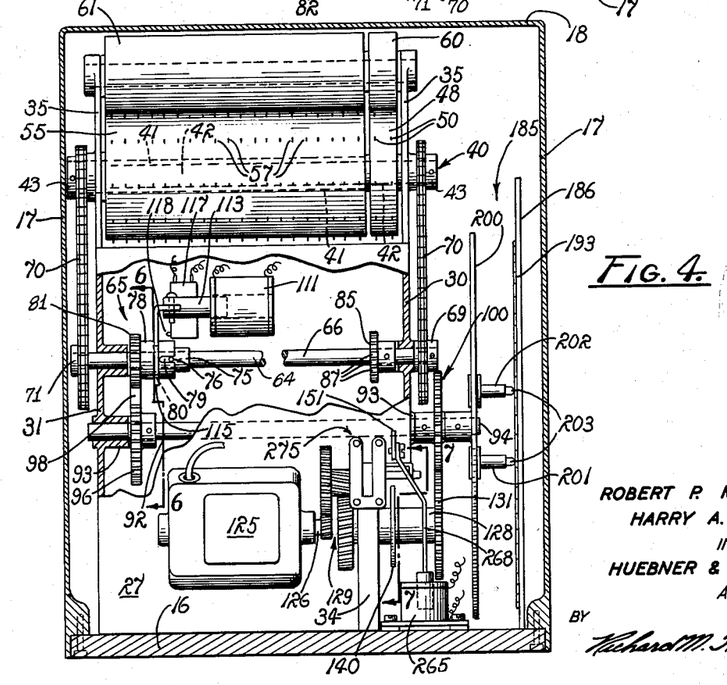
FIG. 4 is a vertical section through the dispensing housing at a position represented by line 4—4 in FIG. 2 but with parts broken away to show internal construction.

As best seen in FIGS. 3 and 4, a frame 26 is mounted within the dispensing housing 15 on the base 16. The frame includes spaced parallel front and rear panels 27 and 28 rigidly interconnected by spaced parallel side panels 30 and 31. Spaced parallel brackets 33 are rigidly rearwardly extended from the rear panel of the frame while a support bracket 34 is forwardly extended from the front panel. Also, upper brackets 35 are upwardly extended from the frame.

As best illustrated in FIGS. 2 and 4, a composite feeding shaft 40 includes an outer sleeve 41 having an end journaled in one of the upper brackets 35, and an inner rod 42 rotatably axially fitted in the outer sleeve and having an end journaled in the other upper bracket. Driven sprockets 43 are respectively secured to the ends of the sleeve and the rod laterally outwardly of the upper brackets. It is thus evident that the sleeve and the rod are rotatably mounted in coaxial relation on the frame for independent rotation about a common axis. A supply shaft 46 is journaled in the rear support brackets 33 in downwardly, rearwardly spaced parallel relation to the feeding shaft.

In the illustrated embodiments of the invention as adapted for dispensing trading stamps, the device is suited to the dispensing of multiple units from a roll several stamps wide for the bulk of the stamps. Further, it is adapted to dispense a series of stamps from a single strip in order to make up any odd number of stamps which may be due over and above that which may be dispensed in multiples of increments from the wide roll. A drum 48, known as a unit strip feeding drum because it is adapted to dispense a strip of single stamps, is secured to the inner rod 42 of the composite feeding shaft 40. The sleeve 41 stops short of the drum 48, and the drum is secured directly to the inner rod 42 for rotation with the rod 42. In this embodiment, the drum 48 is located adjacent to the right-hand upper bracket 45. Rigid pegs 50 extend radially from the drum 48 in rows spaced at regular intervals. A units roll 51 of wound, flexible sheet material is freely journaled on the supply shaft 46 in substantially the same vertical plane as the units feeding drum. The axial length of the units feeding drum and roll is approximately the same. The sheet material on the units roll constitutes one strip of trading stamps separably interconnected along perforated tear lines. The free end of this single strip is trained over the feeding drum with the pegs extended through the perforations and with said free end extended outwardly through the short dispensing slot 22 in the front wall 18 of the housing 15.

A feeding drum 55 for a multiple strip is concentrically secured to the outer sleeve 41 of the feeding shaft 40 and occupies the space between the other upper bracket 35 and the units feeding drum 48. Pegs 57 are also radially outwardly extended from the multiple feeding drum. A multiple roll 58 of wound, flexible roll 58 material is journaled on the supply shaft 46. This sheet includes a plurality of interconnected strips of trading stamps arranged in rows longitudinally and transversely of the sheet. In the illustrated embodiment, there are ten stamps in each transverse row. This multiple sheet is trained over the multiple feeding drum and extended outwardly through the long dispensing slot 22. Therefore, upon driven rotation of the feeding drums 48 and 55, the corresponding strips of sheet material are fed outwardly through their respective slots. Preferably, pressure drums 60 and 61 are journaled on the upper brackets and individually bear against the units and multiple feeding drums. The presser drums are for insuring extension of the pegs through their respective perforations whereby the sheets are motivated in proper timed relation to the rotation of the feeding drums and for applying desired frictional resistance to rotation of the feeding drums; this counteracts momentum of the feeding drums and resists overrunning thereof upon cessation of their rotational drives, as described below.

A clutch mechanism is generally indicated by the numeral 65 in FIG. 4. This mechanism includes a pair of driven shafts 64 and 66 having opposite ends journaled in bearings 67 and 68, respectively, in the side panels 30 and 31 of the frame 26. The driven shafts are mounted in spaced parallel relation in a substantially common plane parallel to the base 16. In order to illustrate both of these shafts in the front view of FIG. 4, the forward one of the two shafts 64 is broken off with the right-hand extension removed, and conversely, the rearward of the two shafts 66 is broken off with the left end removed. The shafts 64 and 66 extend through the side panels 30 and 31. Drive sprockets 69 and 71 are secured to the driven shafts 64 and 66 respectively and are adjacent to opposite side panels of the frame 26 and outwardly thereof. Chains 70 are individually trained around these drive sprockets and the driven sprockets 43 associated with the sleeve and rod 41 and 42, respectively. That is, rotation of the driven shafts respectively imparts rotation to the units feeding drum 48 and multiple strip feeding drum 55.

With continued reference to FIGS. 3 and 4, bearing collars 75 are rigidly secured to the driven shafts 64 and 66, and pins 76 are diametrically oppositely outwardly extended from the collars. Tubular hubs 78 circumscribe the driven shafts and are individually longitudinally slidably fitted over the bearing collars. The hubs have diametrically opposite, longitudinally extended notches 79 respectively receiving the pins 76 for guiding axial movement of the hubs on their respective collars. Driven counter gears 81 and 82 have a plurality of substantially equally, circumferentially spaced teeth, are individually concentrically secured to the hubs 78 for slidable movement with the hubs on the shafts. Because of the different functions performed thereby, it is convenient hereinafter to refer to the gear 81 as a units counter gear and gear 82 as a multiple digit counter gear, it being noted that the units counter gear 81 is associated with the driven shaft 64 coupled to the units feeding drum 48, whereas while the multiple digit counter gear 82 is associated with the driven shaft 66 coupled to the multiple strip feeding drum 55.

As best illustrated in FIG. 3, toothed detent wheels 85 are individually rigidly secured to the driven shafts 64 and 66 at opposite ends thereof from the counter gears 81 and 82. Also, spring-pressed detents 86 are mounted in the front and rear panels 27 and 28 in substantially the same plane as the driven shafts and respectively engage the detent wheels. The detents are spring-pressed for movement radially of the driven shafts into and out of depressions 87 between the teeth of the wheels and are for the purpose of causing the driven shafts to stop at predetermined angular positions when power drive thereto is interrupted.

Figure 6:
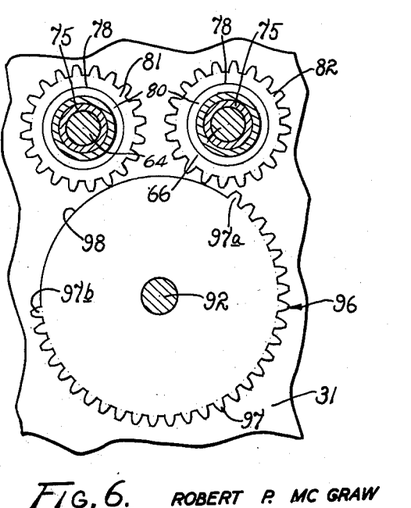
FIG. 6 is a fragmentary, somewhat enlarged section taken on line 6—6 in FIG. 4.

The clutch mechanism 65 also provides a drive shaft 92 rotatably journaled by bearings 93 in the side panels 30 and 31 of the frame 26 in downwardly spaced parallel relation to the driven shafts 64 and 66. The drive shaft 92 has an end portion 94 outwardly extended from the side panel 30. A counter drive gear 96 is located near panel 31 below the counter gears 81 and 82. This drive gear is best illustrated in FIG. 6. It is secured to the drive shaft in axially fixed position thereon. The counter drive gear has a plurality of substantially equally circumferentially spaced gear teeth 97 around a segment of its circumference, said teeth including circumferentially spaced lead and trailing teeth 97a and 97b defining a holiday or gap 98 therebetween. It is to be noted at this point that the counter gears 81 and 82 are individually movable axially of the drive shaft between positions coplanar with the counter drive gear, as illustrated in FIG. 4, and positions displaced from said coplanar relation. In the coplanar position of the counter gears, the counter gear teeth are disposed for meshed engagement with the teeth 97 of the counter drive gear. However, when the holiday is immediately adjacent to the counter gears, the latter are in peripherally adjacent spaced relation to the counter drive gear, as illustrated in FIG. 6. A driven gear 100 is secured to the extended end portion of the drive shaft.

Counter gear control solenoids 110 and 111, respectively adapted for controlling the dispensing action of the units and multiple strip feeding drums 48 and 55, are mounted in the frame 26 above the driven shafts 64 and 66. Solenoid 110 is mounted on front panel 27. Because the front panel 27 is broken away for purposes of illustration in FIG. 4, the solenoid 110 is missing and is thus illustrated only in the wiring diagram of FIG. 8. Each solenoid has an armature 113 movable inwardly of the solenoid upon energization of the solenoid. Each hub 78 has an annular groove 80. An angulated fork 115 secured to the armature and providing a bifurcated end fitted in the groove 80 of its respectively associated hub 78. Thus, when the solenoids are energized, the associated counter gears 81 and 82 are slid axially of their respective driven shafts out of coplanar relation with the counter drive gear 96. Spring means, not shown, are provided for urging the counter gears back into a normal coplanar position when their respective solenoids are de-energized. A normally open holding switch 117 is mounted in the frame adjacent to each control solenoid and includes a button 118 in the path of movement of its associated fork whereby the holding switch is closed upon energization of its respective solenoid.

Figure 5:
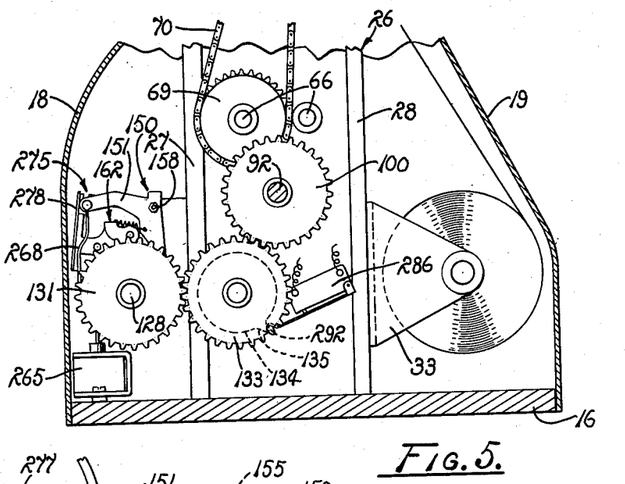
FIG. 5 is a transverse section taken on a plane represented by line 5—5 in FIG. 3.

An electric motor 125 is mounted on the front panel 27 of the frame 26 and includes an output shaft 126 extended in substantially parallel relation to the front panel, as best illustrated in FIGS. 3 and 4. A main drive shaft 128 is journaled in the front support bracket 34 and is coupled to the output shaft of the motor by reduction gearing 129. Refer now to FIG. 5. A drive gear 131 is secured to the main drive shaft and is drivingly connected to the drive shaft 92 of the clutch mechanism 65 through a driven gear 100 and an idler gear 133 journaled on the side panel 30 of the frame. Upon energization of the motor, the drive shaft 92 is rotated, as will be evident. A cam wheel 134 is secured to the idler gear concentrically thereof and includes a radial projection 135 for a purpose to be described.

Figure 7:
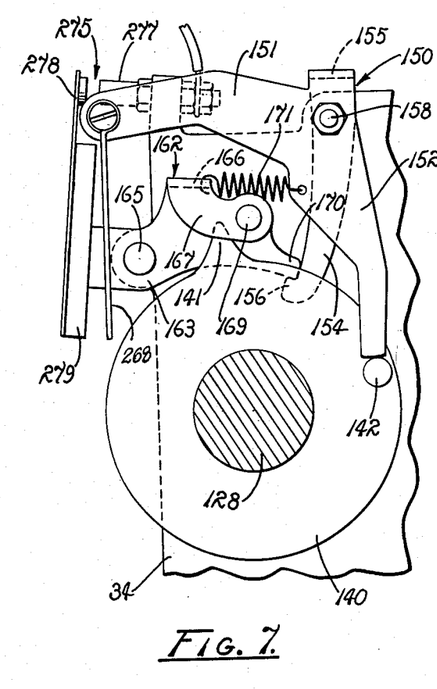
FIG. 7 is a somewhat enlarged, fragmentary section taken on line 7—7 in FIG. 4.

With reference to FIGS. 4 and 7, a motor control wheel 140 is secured to the main drive shaft 128 and in a predetermined plane of reference. The wheel has a radially outwardly extended cam 141 movable in a predetermined circular path in said plane of reference and concentric to the main drive shaft. An abutment 142 is secured to the control wheel in circumferentially spaced relation to the cam and outwardly extended from said plane of reference in radially spaced relation to the main drive shaft.

A primary bell crank 150 includes angularly related control and stop arms 151 and 152 in a substantially common plane, and a holding arm 154 secured in opposed, relatively adjacent spaced relation to the stop arm by a web 155. Thus, the holding arm is offset from the plane of the control and stop arms. The holding arm 154 provides an end portion 156 angularly outwardly extended therefrom. The primary bell crank is mounted on the support bracket 34 by a pivot pin 158 connected to the stop and holding arms with the pivot pin in upwardly spaced relation to the main drive shaft 128; with the stop and holding arms on opposite sides of the control wheel 140, and thus the plane of reference thereof; with the stop arm 152 downwardly extended on the same side of the control wheel as the abutment 142 and movable into the path of travel of the abutment incident to rotation of the control wheel; and with the control arm 151 extended transversely of the main drive shaft generally forwardly from the pin 158, as perhaps best illustrated in FIG. 3.

A switch control lever 162 includes an arcuate mounting portion 163 having opposite ends and being pivotally mounted on the support bracket 34 intermediate said ends by a pin 165 parallel to the pivot pin 158 although rearwardly downwardly spaced therefrom. An offset portion 166 is transversely extended, axially of the main drive shaft 128, from an end of the mounting portion. The mounting portion of the switch control lever is on the opposite side of the motor control wheel 140 from the abutment 142 but the offset portion extends above and on the opposite side of the path of the cam 141 from said mounting portion. A connecting portion 167 is secured to the offset portion on the opposite side of the cam from the mounting portion and is extended rearwardly from the pin 165. A shoulder 169 is secured to the connecting portion and is extended in spaced parallel relation to the offset portion in the path of travel of the cam 141. A pawl 170 is arcuately downwardly extended from the shoulder on the opposite side of the control wheel from the abutment and in the same plane as the holding arm 154. The pawl is disposed for engagement with the holding arm above the end portion 156 thereof. A further relationship between the crank 150 and the lever is that the shoulder and the connecting portion are positioned between the planes of the stop and holding arms 152 and 154. A tension spring 171 interconnects the holding arm and the offset portion and is extended above the pin 165 and below the pin 158. Thus, both the switch control lever and the crank are urged to pivot in a clockwise direction about their respective pivot pins. As previously indicated, the abutment 142 moves in a predetermined circular path concentric to the main drive shaft 128 incident to rotation of the motor control wheel 140. The spring 171 yieldably urges the stop arm 152 into the path of travel of the abutment. The motor control wheel has a predetermined "rest" position, as illustrated in FIG. 7, with the crank in a locking position wherein the stop arm endwardly engages the abutment in substantially right-angular relation to a radius line extended from the main drive shaft through the abutment. As long as the stop arm remains in this position, rotation of the motor control wheel in a counterclockwise direction, as viewed in FIG. 7, is precluded. It is also to be observed that when the crank is in its locking position, with the stop arm engaging the abutment, as above described, the pawl 170 is in abutment with the holding arm 154 above its end portion 156. This association of the pawl and the holding arm limits rotation of the switch control lever in a clockwise direction incident to the action of the spring.

Figure 8:
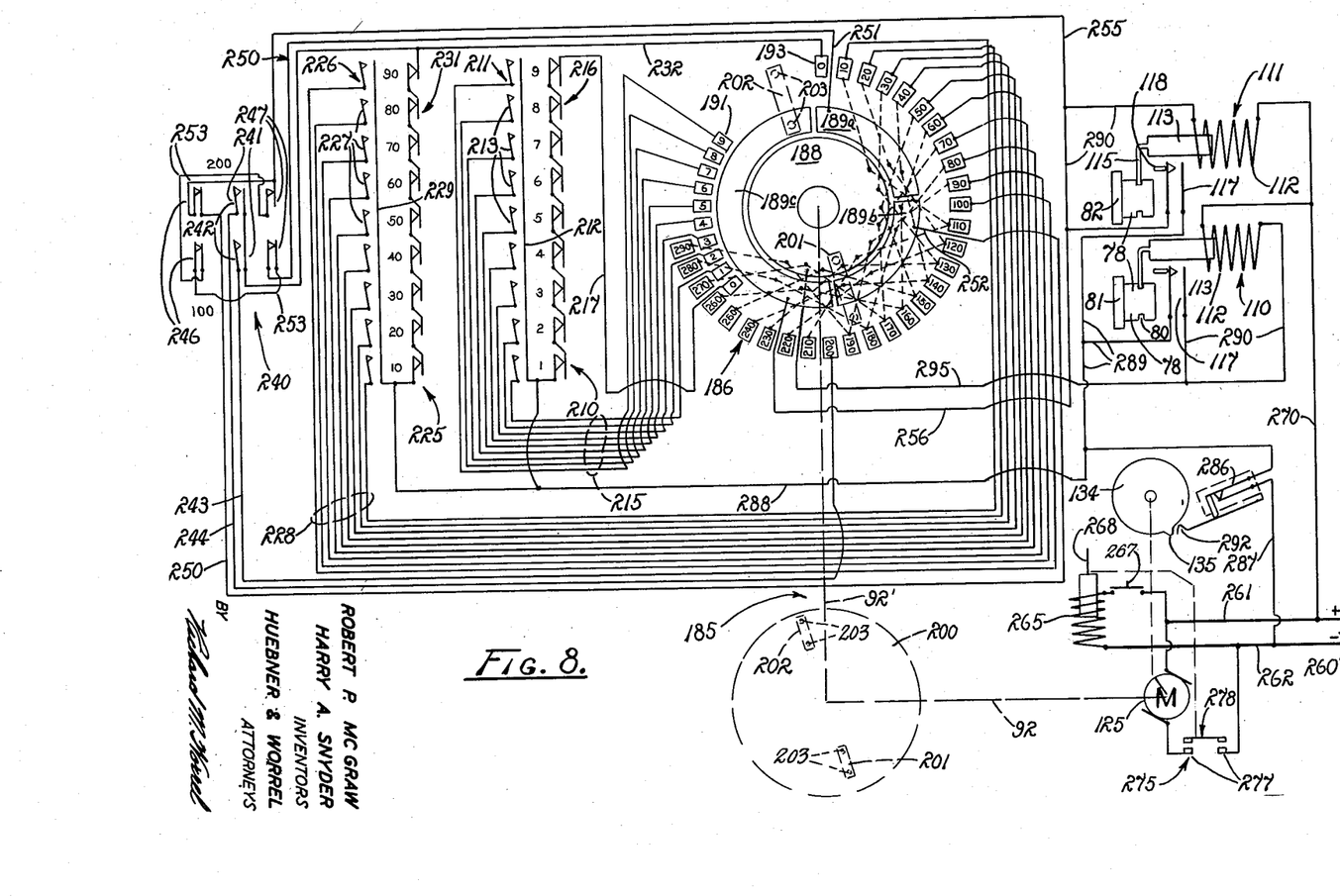
FIG. 8 is an electrical schematic diagram showing various portions of the subject machine and their relationship in the electrical system employed.

The dispensing housing 15 also encloses a rotary switch generally indicated by the numeral 185 in FIGS. 4 and 8. This switch includes a stator, generally identified by the numeral 186. The stator is an insulated panel. A units contact disk 188 of electrically conductive material is mounted on the stator panel concentric to a predetermined axis. A plurality of electrically conductive, multiple digit, contact segments 189a, 189b, and 189c are mounted on the stator in circumferentially spaced relation concentrically about the disk 188 and insulated from each other and from the disk. Also, the stator includes an inner row of substantially equally circumferentially spaced units switch pads 191. This inner row of pads is mounted on the stator panel, extended along an arc of a circle concentric to the disk, and radially outwardly spaced from one of the contact segments 189c. Also, the inner pads are successively numbered from zero to nine in a clockwise direction, as viewed in FIG. 8, and in increments of one. Still further, the stator provides an outer row of multiple digit pads 193 mounted on the stator panel in radially outwardly spaced relation from the inner row of pads, concentric to the disk, in substantially uniformly circumferentially spaced relation to each other, and numbered from zero to two hundred and ninety progressing in units of ten clockwise of the disk. While not critical, it is to be noted that the inner pads numbered from zero through three are overlapped circumferentially of the disk by the outer pads numbered two-hundred sixty through two-hundred and ninety.

The rotary switch 185 also provides a rotor 200 illustrated in FIGS. 3 and 4 in full lines and diagrammatically illustrated in dashed lines in FIG. 8, it being noted that the showing of the rotor in FIG. 8 is on a reduced scale from the stator 186 in FIG. 8. The rotor is a circular wheel or disk concentrically mounted on the extended end portion 94 of the clutch drive shaft 92 outwardly of the driven gear 100. It is to be noted that the stator panel is mounted in an erect position on the base 16 in endwardly spaced, substantially parallel relation to the rotor with the circular disk 200 coaxial with the drive shaft 92. The clutch drive shaft is indicated by a dashed line in FIG. 8, and the axis of this shaft is identified by the numeral 92' in FIG. 8 to indicate the coaxial relationship of the rotor, the stator and the drive shaft. The rotor provides a units bridging bar 201 and a multiple digits bridging bar 202 diametrically positioned on rotor 200 with respect to the units bar. Each of the bars is of electrically conductive material and mounts a pair of spaced carbon brushes 203. See FIG. 8. The inner brush on the units bar is in continuous electrical, slidable contact with the disk 188 while the outer brush on the units bar is mounted for travel in a circular path coincident with the arc of the inner row of switch pads 191 so as electrically to contact the units switch pads incident to movement thereover. The inner brush of the multiple digits bridging bar 202 is in electrical sliding contact with one of the segments 189a, 189b, and 189c depending upon the position of the multiple bridging bar circumferentially of the axis 92′. The outer brush of the multiple digits bridging bar 202 is movable in a circular path coincident with the outer row of pads 193 so as electrically to contact these pads individually upon movement thereover. It is believed understood, therefore, that the units bridging bar establishes electrical contact between individual units switch pads and the disk while the multiple bridging bar establishes electrical contact between various individual outer pads and various of the segments. In a manner to be described, the rotor is adapted to rotate in a clockwise direction, as viewed in FIG. 8. It is significant that the bridging bars are located in predetermined angularly spaced relation to the zero pads of their respectively associated rows of pads when the motor control wheel 140 is in its above described "rest" position. This position of the bridging bars is illustrated in FIG. 8. In the illustrated embodiment, the units bar is angularly spaced ahead, with reference to said direction of rotor rotation, of the zero units pad by about sixty degrees while the multiple bridging bar is spaced ahead of its zero multiple digit pad by about fifteen degrees. The indication of these specific angular displacements is for descriptive convenience only and obviously does not limit the invention thereto.

With reference to FIG. 8, a units switch bank is generally indicated just to the left of the rotary switch by the numeral 210. This bank includes a plurality of selector switches 211 numbered from one to nine, having a common connection 212, and including actuating members 213 individually connected to the units switch pads 191 by leads 215. As shown, like numbered switches and pads are interconnected. The units switch bank also includes a plurality of shunting switches 216 individually associated with the selector switches and being connected in series with each other. The shunting switch associated with selector switch number nine is connected by lead 217 to the zero units switch pad. The shunting switch associated with the number one selector switch is connected to said common connection 212. The shunting switches are normally in a closed position and are yieldably urged to return to said closed positions. However, the selector switches are normally in an open position. The switch bank operates so that when a given selector switch is closed, its associated shunting switch opens. Further, assuming one of the selector switches to be closed, subsequent closing of another selector switch automatically retracts the previously closed selector switch. The specific mechanism of the units switch bank to accomplish the above described functions is well-known in the art, forms no particular part of the present invention, and, therefore, is not described in detail herein.

A tens switch bank is generally indicated by the numeral 225 in FIG. 8. The construction of this bank is the same as the units switch bank although its connections in the dispensing mechanism are different. Thus, the tens bank includes a plurality of selector switches 226 numbered from ten through ninety in increments of ten and including actuating members 227 individually connected to the multiple digit pads 193 numbered ten through ninety by leads 228, a common connection 229, and serially connected shunting switches 231 connected to the zero multiple digit pad by lead 232 and being connected at the ten shunting switch 231 to the common connection 229. As previously inferred, the shunting switches are normally closed, the selector switches are normally open, each shunting switch is individually opened by closing its corresponding selector switch, and closing of any multiple selector switch opens a previously closed multiple selector switch.

Still further, a hundreds switch bank is indicated by the numeral 240. This bank includes "one hundred" and "two hundred" selector switches 241 including actuating members 242 individually connected by leads 243 and 244 to the one hundred and two hundred multiple digit pads 193. Each hundreds selector switch has first and second shunting switch 246 and 247. The hundreds switch bank operates in a manner similar to the banks 210 and 225. As is evident in FIG. 8, the selector switches are normally open while their corresponding shunting switches are normally closed. Closing of either selector switch opens its corresponding shunting switches. Further, if one of the hundreds selector switches is closed, closing of the other thereof opens the previously closed selector switch.

With reference to the hundreds switch bank 240, it is to be noted that an electrical, hundreds connecting lead 250 provides an end portion 251 connected to the contact segment 189a, an opposite end portion 252 connected to the contact segment 189b, and intermediate switch connected portions 253 connecting the shunting switches 246 and 247 in series with each other and with said end portions 251 and 252. Further, a multiple solenoid connecting lead 255 interconnects the second shunting switch 247 associated with the two hundred selector switch 241 and the multiple counter gear control solenoid 111. Additionally, a segment connecting lead 256 electrically interconnects the contact segment 189c and the control solenoid 111.

With continued reference to FIG. 8, a source of electrical voltage is generally indicated by the numeral 260. A pair of electrical lines 261 and 262 are provided for connection to the source of voltage and for conducting said voltage into the subject machine. A crank control solenoid 265 is connected in series with a momentary contact type master control switch 267 across the lines. The crank control solenoid includes an elongated armature rod 268 pivotally connected to the control arm 151 of the bell crank 150, as viewed in FIG. 7. When the master control switch is closed, the crank control solenoid is energized to pull downwardly on said rod thereby to pivot the primary crank 150 in a counter-clockwise direction and out of its locking position. When the master control switch is opened, the solenoid is de-energized whereby the spring 171 returns the crank to its locking position. A lead 270 connects one of the incoming lines 261 to both of the units and multiple gear control solenoids 110 and 111.

A motor control switch 275 includes a pair of stationary contacts 277 mounted on the support bracket 34, as illustrated in FIG. 7, and individually connected to one of the incoming power lines 262 and to the motor 125, as best illustrated in FIG. 8. The motor control switch also includes a movable bridging contact or bar 278 mounted on a bracket 279, evident in FIG. 7, borne by an end of the mounting portion 163 of the switch control lever 162. Mounted in this manner, the bridging contact is in opposed relation to the stationary contacts for movement between an open position, as illustrated in FIG. 7, when the motor control wheel 140 is held in its "rest" position by the above described action of the bell crank 150 and switch control lever, and a closed position, not shown in FIG. 7, when the bell crank is moved out of its locking position by energization of the crank control solenoid 265 and corresponding downward movement of the rod 268. That is, when the crank moves out of its locking position, the end portion 156 moves out from under the pawl 170 whereby the spring 171 pivots the switch control lever in a clockwise direction to bring the bridging contact into electrical engagement with the stationary contacts.

A solenoid control switch 286 having a normally closed position and preferably of micro-switch type, is connected to the power line 262 by lead 287. The solenoid control switch is mounted on one of the side panels 30 and is also connected to each of the units and tens switch banks 210 and 225 by lead 288. In addition, leads 289 interconnect the solenoid control switch and each of the holding switches 117, it being noted that the holding switches are also connected by leads 290 to the opposite ends of their respective counter gear control solenoids 110 and 111 from the ends of these solenoids which are connected to the line 261. Still further, the holding switch associated with the units control solenoid is connected to the disk 188 of the rotary switch 185 by lead 295. The solenoid control switch has a switch opening arm 292 extended in the path of the projection 135 on the cam wheel 134, as best seen in FIGS. 5 and 8. During each rotation of the cam wheel, the projection engages the arm and momentarily opens the solenoid control switch. After the projection moves past the arm, the solenoid returns to its normally closed position.

As best illustrated in FIG. 1, the subject machine also includes a switch box or housing 300 having opposite side walls 301, opposite end walls 302, and a top wall 303. This housing encloses the units, tens, and hundreds switch banks 210, 225 and 240 as well as the master control switch 267 and associated wiring. The actuating members 213, 227, and 242 are slidably upwardly extended through the top wall of the switch box for convenience of manipulation. The top wall bears indicia corresponding to that appropriate for each selector switch. A cable 305 interconnects the dispensing housing 15 and the switch box and carries the electrical leads between the switch banks and the master control switch and the parts in the dispensing housing to which they are electrically connected.

OPERATION

The operation of the described embodiment of the subject invention is briefly summarized at this point. In the quiescent, or non-dispensing, state of the subject machine, the actuating members 213, 227, and 242 are upwardly retracted, the motor control wheel 140 is held in its "rest" position by the bell crank 150, the motor control switch 275 is held open by the switch control lever 162 and the bell crank, the control solenoids 110 and 111 are de-energized, the solenoid control switch 286 is closed, and the driven counter gears 81 are in coplanar engageable positions relative to the counter drive gear 96. In this latter regard, and by reference to FIG. 6, it is to be noted that the lead tooth 97a is angularly displaced from meshing engagement with the multiple driven counter gear 82 by approximately fifteen degrees; this is the same angular displacement that exists between the zero pad 193 and the multiple bridging bar 202. Similarly, the angular displacement between the lead tooth 97a and meshing engagement thereof with the units counter gear 81 is approximately sixty degrees or equal to the angular displacement between the units bridging bar 201 and the zero units pad 191.

Assuming that it is desired to dispense five trading stamps from the machine, the number five selector switch 213 in the units bank 210 is depressed thereby opening its corresponding shunting switch 216. The master control switch 267 is closed. This energizes the crank control solenoid 265 thereby to close the motor control switch 275 incident to movement of the crank 150 into unlocking position. With the motor 125 energized, and the stop arm 152 out of the path of travel of the abutment 142, the main drive shaft 128 is rotated.

Rotation of the main drive shaft 128 imparts rotation to the drive shaft 92 of the clutch 65 through the idler gear 133. This rotates the counter drive gear 96 in a counter-clockwise direction, as viewed in FIG. 6. Further, rotation is imparted to the rotor 200 of the rotary switch 185. When the rotor has moved through approximately fifteen degrees, the multiple digits bridging bar 202 establishes electrical contact between the segment 189a and the zero multiple digits pad 193. This serves to energize the multiple counter gear control solenoid 111 in the following manner having reference to FIG. 8.

Initially, it is to be remembered that one end of the solenoid 111 is connected to one of the lines 261. Electrical voltage is applied to the other end of this solenoid from line 262, through the normally closed solenoid control switch 286, lead 288 to the tens switch bank 225, through the normally closed, serially connected shunting switches 231, through the lead 232, across the multiple bridging bar 202, through the segment 189a, through the hundreds connecting lead 250 and the serially connected shunting switches 246 and 247 of the hundreds switch bank 240, and through lead 255 back to the other end of the multiple control solenoid.

With the multiple counter gear control solenoid 111 energized, its armature 113 is retracted thereby to slide the hub 78 of the multiple driven counter gear 82 axially along its bearing collar 75 to move the multiple driven counter gear out of coplanar meshable relation with the drive gear 96. Retraction of the multiple driven counter gear is, of course, substantially instantaneous upon bridging contact between the zero pad 193 and the segment 189a and occurs immediately in advance of engagement of the lead tooth 97a with the multiple driven counter gear. Accordingly, the multiple strip feeding drum 55 is not rotated and none of the stamps on the multiple roll 58 are fed outwardly through its corresponding dispensing slot 22.

However, as the rotor 200 continues to rotate and advances through approximately sixty degrees from its starting or "rest" position, the units bridging bar 201 is brought into bridging engagement from the contact disk 188 to the zero units switch pad 191. At substantially the same instance, the lead tooth 97a of the counter drive gear 96 is brought into meshed engagement with the teeth on the units driven counter gear 81 and thereafter full meshed engagement is established between the counter drive and driven gears 96 and 81. This meshing relation is continued until the units bridging bar engages the number five pad 191. Upon such engagement, the units counter gear control solenoid 110 is energized, as follows. Of course, as previously noted, one side of the units solenoid is connected to the line. Voltage is applied to the other side through the normally closed solenoid control switch 286, the lead 288 to the units switch bank 210, the common connection 212 to the closed selector switch 211, through the corresponding lead 215 across the units bridging bar, from the disk 188 through lead 295 to the other side of the units control solenoid. In a manner similar to that described above, the units driven counter gear 81 is retracted to disengage the clutch and to preclude further rotation of the units feeding drum 48. It is to be noted that when the control solenoids 110 or 111 are energized, retraction of their respective forks 115 closes their respective holding switches 117 whereby they are maintained connected across the line even after the bridging bars 201 or 202 move out of the positions which caused energization of said solenoids. During the period of rotation of the rotor when the counter drive gear 96 is in engagement with the units driven counter gear 81, the units feeding drum 48 moves five stamps in the units roll 51 outwardly through its corresponding dispensing slot 22. The units feeding drum 55 is stopped in the above described manner so that the rearward edge of the fifth stamp in the strip of stamps being dispensed is immediately under the edge of the dispensing slot. The five stamps ejected are then torn from the strip.

The main drive shaft 128 continues its rotation until, as best illustrated in FIG. 7, the cam 141 engages the shoulder 169 thereby to rock the switch control lever 162 in a clockwise direction about the pin 165 whereby the bridging contact 278 of the motor control switch 275 is moved out of contact with the stationary contacts 277. This de-energizes the motor 125. However, in order to stop the motor control wheel 140 in precisely the same position after each cycle of rotation, the stop arm 152 is disposed for engagement with the abutment 142 thereby limiting continued counter-clockwise rotation of the motor control wheel due to its developed inertia even after opening of the motor control switch. The end portion 156 of the holding arm 154 is brought into a position for receiving the pawl 170 when the cam 141 of the motor control wheel has moved past the shoulder 169 allowing the spring 171 to pull the switch control lever 162 in a clockwise direction to drop the pawl into engagement with the end portion 156. Also, the projection 135 on the cam wheel 134 engages the arm 192 of the solenoid control switch 286 just prior to de-energization of the motor 125. This opens the circuit to the solenoids 110 and 111 whereby both of the solenoids are de-energized and their respective holding switches 117 are opened.

The main control switch 267 is normally open and is of the momentary contact type as described. That is, it is yieldable for movement into a closed position incident to manual pressure thereagainst but upon release of such manual pressure, this main control switch returns to an open position. It is to be noted that upon closing of the master control switch, and prior to opening thereof, the motor control switch 275 closes whereby the motor 125 remains across the line 261, 262 even though the main control switch subsequently opens. Of course, this de-energizes the solenoid 265. However, since the motor control wheel 140 has already been allowed to move in a counter-clockwise direction beyond its "rest" position, return of the control crank 150 by the spring 171 toward or into its locking position does not disturb such rotation until the abutment 142 again moves into a position endwardly engaging the stop arm 152.

The counter drive gear 96 is thus returned to its initial or "rest" position. Also, because the solenoids 110 and 111 are de-energized, their corresponding driven counter gears 81 and 82 are moved axially of their respective shafts 66 into co-planar relation with the counter drive gear 96 and into the holiday 98 thereof. The mechanism is now ready for a subsequent cycle of operation.

Assuming thirty stamps are desired, and further assuming that the machine is in its quiescent state with all of the actuating members 213 and 227 retracted, the thirty selector switch in the tens switch bank 225 is depressed. The master control switch 267 is closed. The action of the machine is similar to that described above except that closing of the fifty selector switch causes three transverse rows of stamps in the multiple sheet 58 to be fed through the dispensing opening 22. After the multiple feeding roll 55 has been rotated through an angle sufficient to dispense said three transverse rows, the multiple control solenoid 111 is energized to disengage the clutch 65 insofar as the drive gear 96 and the multiple counter gear 82 are concerned. The units control solenoid 110 is energized before the drive gear 96 moves into mesh with the units counter gear 81; this is accomplished by bridging of the bar 201 from the disk 188 to the zero pad 191 in the units row of pads. In other respects, the machine goes through its cycle of operation in the same manner as before and returns all of the elements of the machine to a quiescent state after said cycle of operation.

It is believed evident how one hundred stamps are obtained from the subject machine by closing the one hundred selector switch 241. Still further, if two hundred sixty-eight stamps, for example, are desired, the two hundred selector switch 241, the sixty selector switch 227 in the tens bank 225, and the number eight selector switch 213 in the units bank 210 are closed. By tracing out the circuits thus established, it is demonstrated that twenty-six transverse rows of stamps in the multiple sheet 58 and eight stamps in the units sheet 51 are fed through the dispensing slots 22. In fact, with the disclosed embodiment of the subject machine, any number of stamps from one through two hundred ninety nine can be obtained. Of course, the invention is not limited to a machine capable of dispensing this precise number or range of stamps. Instead, the principles of the subject invention can be applied to machines of more or less capacity.

It is to be observed that if the main control switch 267 is closed with all of the selector switches 213, 227, and 241 open, the solenoids 110 and 111 are energized before the drive gear 96 engages either of the driven gears 81 or 82, thereby precluding any rotation of the feeding drums 48 or 55 so that no stamps are dispensed. The motor control wheel 140 simply goes through one cycle and stops.

From the foregoing, it will be evident that a machine adapted to dispense predetermined lengths of sheet material has been provided. The machine is especially suited for use in dispensing predetermined amounts of trading stamps. Of particular significance is the drive mechanism employed in the machine whereby rotation of the sheet feeding rolls is interrupted by an electrically controlled clutch mechanism after a predetermined extent of operation is completed. It is evident that the machine involves a minimum amount of moving parts and linkages and emphasizes electrical control where possible. Thus, the machine is dependable in operation and requires a minimum of maintenance attention and expense. When used for dispensing trading stamps in retail outlets, it results in savings in time and money and enables more complete control over the distribution of trading stamps.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. In a dispenser including a support, a feeding shaft, a drive gear rotatably mounted in the support, a driven gear, means rotatably mounting the driven gear in the support for movement axially thereof into and out of coplanar, meshable relation with the drive gear, coupling means interconnecting the driven gear mounting means and the shaft for imparting rotation to the shaft upon rotation of the driven gear, an electrical solenoid borne by the support and mechanically connected to the driven gear for moving the driven gear axially out of meshable relation with the drive gear, said drive and driven gears being urged into said meshable relation when the solenoid is de-energized, and switch controlled electrically powered means connected to the drive gear and to the solenoid for initially imparting rotation to the drive gear whereby the drive and driven gears mesh to impart rotation to the shaft and, after predetermined rotation of the shaft, for energizing the solenoid to move the driven gear out of meshed engagement with the drive gear thereby to stop rotation of the shaft.

2. In a dispensing apparatus, a support; a feeding shaft rotatably journaled in the support; clutch means borne by the support including meshable drive and driven gears; means mounting the driven gear for movement between a normal position adapted to mesh with the drive gear and a position retracted from said normal position wherein the gears are precluded from meshing; means interconnecting the driven gear and the shaft whereby rotation is imparted to the shaft upon rotation of the driven gear; electromechanical means mounted in the support and engaging the driven gear for moving the driven gear out of said normal position upon energization of said electromechanical means; controllably powered means mounted in the support having driving connection to the drive gear for rotating the drive gear through a predetermined angle upon actuation of the powered means; and electrical switch means borne by the support and interconnecting the drive gear and the electromechanical means for energizing the electromechanical means after predetermined rotation of the drive gear thereby to move the driven gear out of said normal position whereby rotation of said feeding shaft is limited.

3. In a sheet material dispensing machine including a support and a feeding shaft rotatably mounted in the support; the combination of a drive shaft rotatably mounted in the support; a drive gear secured to the drive shaft; a driven gear; means rotatably mounting the driven gear in the support for movement between a meshable position with respect to the drive gear and a position retracted from said meshable position; linkage means interconnecting the feeding shaft and said mounting means for imparting rotation to the feeding shaft upon rotation of the driven gear; a source of electrical energy; a motor having driving connection to the drive shaft and being in electrical circuit with the source whereby energization of the motor imparts rotation to the drive shaft; a solenoid mounted in the support including an armature connected to said mounting means for moving the driven gear between said meshable and retracted positions and being electrically connected to said source; a rotary switch including a stator borne by the support having a common electrical contact connected to the solenoid and a plurality of dispense control contacts insulated from the common contact; and a rotor mounted on the drive shaft including a bridging member electrically contacting said common contact, and being rotatable with the drive shaft for movement into successive electrical contact with said dispense control contacts thereby successively individually electrically bridging between said common and control contacts, and switch means selectively interconnecting the dispense control contacts and said source for selectively connecting one of the dispense control contacts to the source whereby the solenoid is energized when the bridging member contacts the control contact connected to the source thereby to move the driven gear into retracted position whereby rotation of the feeding shaft is limited.

4. In a dispensing machine including a support and a feeding shaft rotatably mounted in the support; a drive mechanism for imparting predetermined rotation to the feeding shaft comprising a clutch mounted in the support including disengageable drive and driven members; means coupling the driven member and the feeding shaft; a source of electrical energy; an electrical motor having an output shaft; circuit means electrically connecting the motor to the source; a solenoid mechanically connected to the clutch for disengaging the same upon energization of the solenoid; solenoid control, rotary switch means electrically connected in series circuit with the solenoid and said source, said switch means having a normally open position but being closed incident to rotation thereof for energizing the solenoid; and a drive linkage borne by the support connecting the output shaft of the motor to the drive member of the clutch and to the rotary switch means for rotating the drive member and the switch means in synchronization and for closing said switch means after predetermined rotation of the drive member thereby to disengage the clutch and to control rotation of the feeding shaft.

5. The mechanism of claim 4 wherein said circuit means includes control means operably associated with the drive linkage for permitting rotation of said output shaft through successive predetermined cycles of rotation, for de-energizing the motor upon completion of each such cycle, and for stopping said output shaft at precisely the same rotational position after each cycle of rotation.

6. In a dispensing machine including a support and first and second feeding shafts rotatably mounted in the support; a drive mechanism for rotating the feeding shafts comprising a drive shaft rotatably mounted in the support; a drive gear secured to the drive shaft having a plurality of substantially uniformly spaced teeth about a portion of its circumference and including leading and trailing teeth circumferentially spaced from each other and defining a holiday therebetween; first and second driven shafts rotatably mounted in the support and in a common plane on one side of the drive shaft, the drive gear having a rest position with said holiday disposed toward said driven shafts; driven gears having substantially uniformly spaced teeth about their entire circumferences; means individually non-rotatably mounting the driven gears on the driven shafts for axial slidable movement between meshable positions substantially coplanar with the drive gear and with the teeth on the driven gears extended into the holiday of the drive gear in the rest position thereof and retracted positions out of such coplanar relation; a source of electrical energy; an electric motor having an output shaft; controlled circuit means electrically interconnecting the motor and the source for controlled energization of the motor; first and second solenoids borne by the support and respectively mechanically connected to the driven gears for moving the same into their retracted positions upon energization of the solenoids, the driven gears being returnable to meshable positions upon de-energization of the solenoids; solenoid controlling, rotary switch means individually electrically connected in series circuits with the solenoids and said source, said switch means having a normally open position and a plurality of closed positions incident to rotation thereof for selectively energizing the solenoids; and a drive linkage mounted in the support and connecting the output shaft of the motor to the drive shaft and to the rotary switch means for rotating the drive shaft and the switch means in timed relation to each other and for moving the switch means into at least one of its closed positions incident to predetermined rotation of the drive gear thereby to move one or both of the driven gears into retracted position either before or after predetermined meshed engagement with said drive gear.

7. The machine of claim 6 wherein said rotary switch means includes a rotary switch having a stator mounted on the support and providing insulatively spaced first and second common contacts respectively electrically connected to the first and second solenoids, and first and second control contacts insulated from each other and from the common contacts, and a rotor mounted on the drive shaft including first and second bridging bars having inner ends respectively electrically contacting the first and second common contacts and outer ends respectively electrically engageable with the first and second control contacts upon predetermined rotation of the drive shaft, said switch means also including circuits individually electrically connecting the first and second control contacts to the source whereby upon such electrical engagement of the bridging bars with said control contacts, the corresponding solenoids are energized.

8. The mechanism of claim 7 wherein there are a plurality of each of said first and second control contacts; and wherein said circuits include first and second banks of selector switches individually and respectively connected to the control contacts of said plurality of first and second contacts, each of said switch banks being also connected to said source whereby closure of selected switches in said banks controls the time in the cycle of rotation of the rotary switch when said solenoids are energized.

9. The machine of claim 5 wherein the rotor has a rest position corresponding to the rest position of the drive gear; and wherein, in said rest positions of the drive gear and the rotor, the angles between said leading tooth and the teeth first-to-be-engaged thereby on the first and second driven gears are respectively substantially equal to the angles between the outer ends of said first and second bridging bars and the control contacts first-to-be-engaged thereby.

10. In a dispensing machine having an output feeding mechanism; a drive gear; a driven gear; power transmitting means connected from said driven gear to said output feeding mechanism; means mounting one of said drive and driven gears for movement with respect to the other gear between a first relative position in drive transmitting relationship and a second relative position out of such drive transmitting relationship; powered drive means connected to impart drive force to the drive gear; and switch operated electromechanical power means connected to the movable one of said drive and driven gears to move the same between said first and second relative positions, the drive gear having a peripheral holiday so that upon actuation of the powered drive means the drive gear is rotatable through a predetermined angle from a rest position before meshing with the driven gear with said gears in said first relative position.

11. In a dispensing machine having an output feeding mechanism; a drive gear; a driven gear; power transmitting means connected from said driven gear to said output feeding mechanism; means mounting one of said drive and driven gears for movement with respect to the other gear between a first relative position in drive transmitting relationship and a second relative position out of such drive transmitting relationship; powered drive means connected to impart drive force to the drive gear; and switch operated electromechanical power means connected to the movable one of the drive and driven gears to move the same between said first and second relative positions, the driven gear having a plurality of teeth substantially uniformly spaced about the entire circumference thereof, and the drive gear having a plurality of substantially uniformly spaced teeth about a portion of its circumference and including leading and trailing teeth circumferentially spaced from each other and defining a holiday therebetween, the teeth of the driven gear being disposed in said holiday in said rest position whereby the drive gear is movable through a predetermined angle upon actuation of the drive means from the rest position before meshing with the driven gear when the driven gear is in said first relative position.

12. In a dispensing machine having an output feeding mechanism; a drive gear; a driven gear; power transmitting means connected from said driven gear to said output feeding mechanism; means mounting said driven gear for movement between a first relative position in drive transmitting relationship with the drive gear and a second relative position out of such drive transmitting relationship; powered drive means connected to impart drive force to the drive gear; and switch operated electromechanical power means including a source of electrical energy and connected to the driven gear to move the same between said first and second relative positions, said driven gear having a plurality of teeth substantially uniformly spaced about the entire circumference thereof, said drive gear having a plurality of substantially uniformly spaced teeth about a portion of its circumference and including leading and trailing teeth circumferentially spaced from each other and defining a holiday therebetween, the teeth of the driven gear being disposed in said holiday when in said rest position whereby the drive gear is movable through a predetermined angle upon actuation of the drive means from the rest position before meshing with the driven gear when the driven gear is in said first relative position, a gear control solenoid mechanically connected to the driven gear and electrically connected to the source, rotary switch means including a first stationary contact electrically connected to the solenoid, a second stationary contact, a contacting member mounted on the drive gear and being electrically connected to the first contact, and circuit means electrically interconnecting the second contact and the source, the contacting member being spaced from the second contact in said rest position and being electrically engageable with the second contact after movement of the drive gear through an operating angle greater than said predetermined angle to enable meshing of the drive and driven gears through a meshing angle equal to the difference between said operating and predetermined angles.

13. In a dispensing machine having an output feeding mechanism; a drive gear; a driven gear; power transmitting means connected from said driven gear to said output feeding mechanism; means mounting said driven gear for movement between a first relative position in drive transmitting relationship with the drive gear and a second relative position out of such drive transmitting relationship; powered drive means connected to impart drive force to the drive gear; and switch operated electromechanical power means connected to the driven gear to move the same between said first and second relative positions, said driven gear having a plurality of teeth substantially uniformly spaced about the entire circumference thereof, said drive gear having a plurality of substantially uniformly spaced teeth about a portion of its circumference and including leading and trailing teeth circumferentially spaced from each other and defining a holiday therebetween, the teeth of the driven gear being disposed in said holiday when in said rest position whereby the drive gear is movable through a predetermined angle upon actuation of the drive means from the rest position before meshing with the driven gear when the driven gear is in said first relative position, the electromechanical power means including a source of electrical energy and a motor switch, the drive means including a motor connected in electrical series circuit with the source and said switch and providing an output shaft having a rest position corresponding to the rest position of the drive gear and being adapted to rotate through a predetermined cycle incident to energization of the motor upon closing of the switch, and cycle control means operably associated with the output shaft for opening the switch and for stopping rotation of the output shaft precisely at said rest position upon completion of said cycle of rotation.

14. The machine of claim 13 in which the motor switch includes a pair of stationary contacts and a bridging bar and said cycle control means includes a bracket movably carried relative to said stationary contacts and mounting the bridging bar for movement between a switch closing position in electrical engagement with said stationary contacts of the motor switch and a switch opening position in spaced relation to such contacts; including a master control switch; and a motor control solenoid in electrical series circuit with the source, the motor switch, the motor, and the master control switch and being mechanically connected to said cycle control means whereby upon energization of the motor solenoid incident to closing of the master control switch, the cycle control means operates to close the motor switch and to release the output shaft for cyclical movement, said cycle control means opening the motor switch and stopping said output shaft in its rest position upon completion of a cycle of rotation.

15. In a dispensing machine having an output feeding mechanism; a drive gear; a driven gear; power transmitting means connected from said driven gear to said output feeding mechanism, means mounting said drive and driven gears for movement of the driven gear relative to the drive gear between a first relative position in drive transmitting relationship with the drive gear and a second relative position out of such drive transmitting relationship; powered drive means connected to impart drive force to the drive gear; switch operated electromechanical power means including a source of electrical energy and connected to move the driven gear between said first and second positions in relation to the first gear, said driven gear having a plurality of teeth substantially uniformly spaced about the entire circumference thereof, said drive gear having a plurality of substantially uniformly spaced teeth about a portion of its circumference and including leading and trailing teeth circumferentially spaced from each other and defining a holiday therebetween, the teeth of the driven gear being disposed in said holiday when in said rest position whereby the drive gear is movable through a predetermined angle upon actuation of the drive means from the rest position before meshing with the driven gear when the driven gear is in said first relative position; a gear control solenoid mechanically connected to the driven gear and electrically connected to the source; rotary switch means including a first stationary contact electrically connected to the solenoid, a second stationary contact, and a contacting member mounted on the drive gear and electrically connected to the first contact; circuit means electrically interconnecting the second contact and the source, the contacting member being spaced from the second contact in said rest position and being electrically engageable with the second contact after movement of the drive gear through an operating angle greater than said predetermined angle to enable meshing of the drive and driven gears through a meshing angle equal to the difference between said operating and predetermined angles, and means to prevent reactivation of the cycle wherein said contacting member is disconnected from the source upon disengagement from said stationary contact; and a holding circuit providing a holding switch connected in series with the solenoid and with the source, said holding circuit being closed upon energization of the solenoid whereby the holding circuit keeps the solenoid energized after movement of the contacting member out of engagement with said second contact.

16. In a dispensing machine having an output feeding mechanism; a drive gear; a driven gear; power transmitting means connected from said driven gear to said output feeding mechanism; means mounting said drive and driven gears for movement of the driven gear between a first relative position in drive transmitting relationship with the drive gear and a second relative position out of such drive transmitting relationship; powered drive means connected to impart drive force to the drive gear; switch operated electromechanical power means including a source of electrical energy and connected to move the driven gear between said first and second relative positions, said driven gear having a plurality of teeth substantially uniformly spaced about the entire circumference thereof, said drive gear having a plurality of substantially uniformly spaced teeth about a portion of its circumference and including leading and trailing teeth circumferentially spaced from each other and defining a holiday therebetween, the teeth of the driven gear being disposed in said holiday when in said rest position, the drive gear being movable through a predetermined angle upon actuation of the powered drive means from a rest position before meshing with the driven gear when the driven gear is in said first relative position; a gear control solenoid mechanically connected to the driven gear and electrically connected to the source; rotary switch means including a first stationary contact electrically connected to the solenoid, a second stationary contact, and a contacting member mounted on the drive gear and electrically connected to the first contact, and circuit means electrically interconnecting the second contact and the source, the contacting member being spaced from the second contact in said rest position and being electrically engageable with the second contact after movement of the drive gear through an operating angle greater than said predetermined angle to enable meshing of the drive and driven gears through a meshing angle equal to the difference between said operating and predetermined angles; and means to prevent automatic reactivation of the cycle wherein said contacting member is disconnected from the source upon disengagement from said stationary contact, including a holding circuit providing a holding switch connected in series with the solenoid and with the source, said holding switch being closed upon energization of the solenoid whereby the holding circuit keeps the solenoid energized after movement of the contacting member out of engagement with said second contact, said drive means rotating the drive gear through a predetermined maximum angle greater than said operating angle; cycle control means operably associated with the drive means for dis- abling the same upon completion of rotation of the drive gear through said maximum angle; a solenoid control switch connected in series with the source, the holding circuit, and with the solenoid having a normally closed position but being yieldably movable into an open position; and cam means rotated by the drive means and engageable with said solenoid control switch upon completion of the rotation of the drive gear through said maximum angle for opening said control switch to de-energize the solenoid.

17. In a dispensing machine having an output feeding mechanism; a drive gear; a driven gear; power transmitting means connected from said driven gear to said output feeding mechanism; means mounting said drive and driven gears for relative movement of the driven gear between a first relative position in drive transmitting relationship to the drive gear and a second relative retracted position out of such drive transmitting relationship; powered drive means connected to impart drive force to the drive gear; switch operated electromechanical power means connected to the driven gear to move the driven gear between said first and second relative positions, said switch operated electromechanical means including a source of electrical energy, an electromagnetic device connected to the source and to said driven gear for moving the latter into retracted position upon energization of said device; a rotary switch including a stator having a common contact electrically connected to said device and a control contact radially outwardly, insulatively spaced from said common contact; and circiut means electrically interconnecting the source and said control contact, the rotary switch also including a rotor mounted on the drive gear and having a bridging bar providing an inner end in electrical contact with said common contact and an outer end momentarily electrically engageable with the common contact after said predetermined rotation of the drive gear thereby to energize said electromagnetic device and to move said driven gear into retracted position.

18. In a dispensing machine having an output feeding mechanism; a drive gear; a driven gear; power transmitting means connected from said driven gear to said output feeding mechanism; means mounting said drive and driven gears for movement of the driven gear between a first relative position in drive transmitting relationship to the drive gear and a second relative position out of such drive transmitting relationship; powered drive means connected to impart drive force to the drive gear; switch operated electromechanical power means connected to move the driven gear between said first and second relative positions, said switch operated electromechanical means including a source of electrical energy, an electromagnetic device connected to the source and to said driven member for moving the latter into retracted position upon energization of said device, a rotary switch including a stator having a common contract electrically connected to said device and a plurality of control contacts radially outwardly spaced from the common contact and circumferentially spaced about a predetermined axis of rotation, the control contacts being insulated from each other and from the common contact; and a plurality of selector switches connected to the source and individually connected to said common contact, the rotary switch also including a rotor mounted on the drive shaft having a bridging bar providing an inner end in electrical engagement with said common contact and an outer end individually, successively electrically engageable with said control contacts incident to rotation of the drive shaft whereby the electromagnetic device is energized after predetermined rotation of the drive shaft as determined by closure of one of the selector switches.

References Cited in the file of this patent

UNITED STATES PATENTS

| | | |
|---|---|---|
| 2,746,751 | Le Baron et al. | May 22, 1956 |
| 3,006,538 | Deutach | Oct. 31, 1961 |